United States Patent [19]

Gilardi

[11] Patent Number: 4,919,862
[45] Date of Patent: Apr. 24, 1990

[54] PROCESS AND APPARATUS FOR MARKING ARTICLES OF FOAM MATERIAL WHEN PRODUCED IRREGULARLY

[75] Inventor: Pier E. Gilardi, Robbio, Italy

[73] Assignee: Gestioni Riunite Toscana Gomma S.p.A., Robbio, Italy

[21] Appl. No.: 304,192

[22] Filed: Jan. 31, 1989

[30] Foreign Application Priority Data

Feb. 10, 1988 [IT] Italy .................. 67096 A/88

[51] Int. Cl.⁵ .................................................. B29C 67/22
[52] U.S. Cl. ........................... 264/40.1; 264/46.4; 425/135
[58] Field of Search ............ 264/54, 40.1, 46.4; 425/140, 141, 135

[56] References Cited

U.S. PATENT DOCUMENTS

| | | | |
|---|---|---|---|
| 3,247,295 | 4/1966 | Burwell | 264/54 |
| 3,836,614 | 9/1974 | Neugroschl | 264/40.1 |
| 3,916,023 | 10/1975 | Porter et al. | 264/40.1 |
| 4,397,625 | 8/1983 | Hellmer et al. | 425/135 |
| 4,412,961 | 11/1983 | Dibiasi et al. | 264/40.1 |
| 4,479,644 | 10/1984 | Bartimes et al. | 264/40.1 |
| 4,647,274 | 3/1987 | Oda | 425/135 |

Primary Examiner—Jan H. Silbaugh
Assistant Examiner—Allan R. Kuhns
Attorney, Agent, or Firm—Young & Thompson

[57] ABSTRACT

A process and apparatus for marking an article made of foam material whenever during its manufacturing process some irregularity has occurred. As a consequence of having ascertained an irregularity in some operational parameter, after the introduction of the reactive mixture in the inner cavity of the lower shell of the mould and as long as the mould is still open, to a part of the inner cavity of the upper shell of the mould is applied a mark formed by a dyestuff resistant to the processing conditions, physically and chemically compatible with the formed article and capable of adhering thereto when, during its expansion, the article reaches to contact the marked part of the inner cavity of the upper shell of the mould. The marking operation can take place automatically by action of an equipment comprising an ejector arranged for spraying towards the internal cavity of the upper shell of the open mould the dyestuff intended to form the mark.

10 Claims, 1 Drawing Sheet

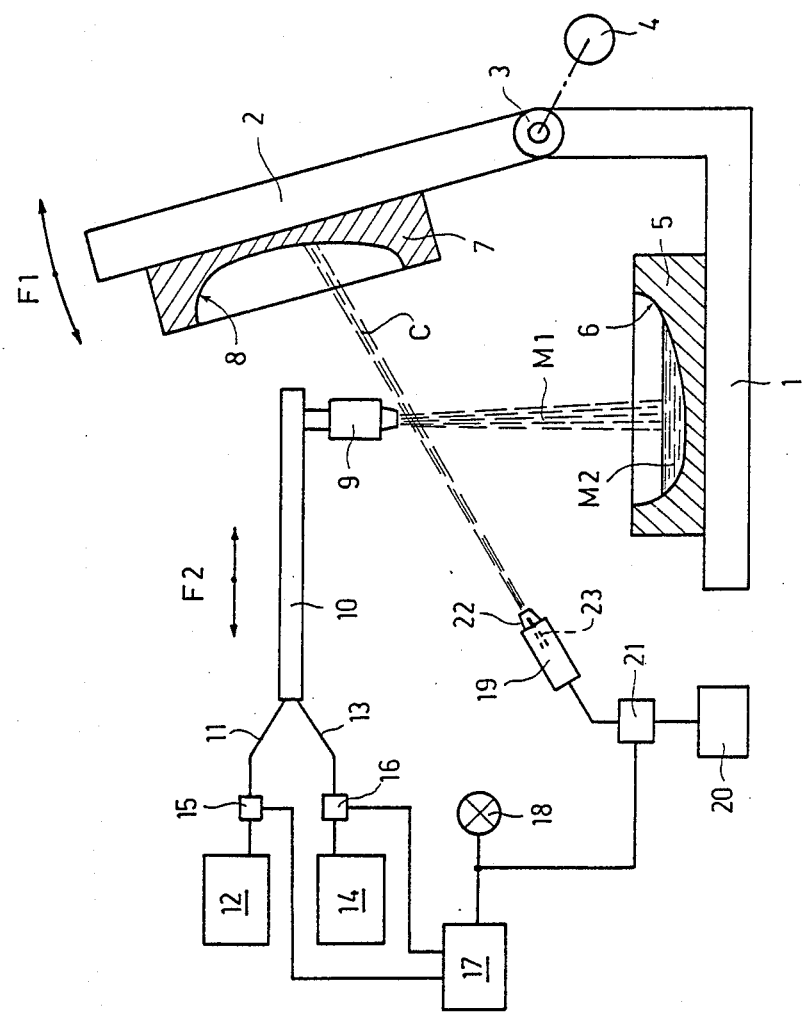

PROCESS AND APPARATUS FOR MARKING ARTICLES OF FOAM MATERIAL WHEN PRODUCED IRREGULARLY

BACKGROUND OF THE INVENTION

This invention refers to a process and an equipment for marking an article of foam material whenever some irregularity has been ascertained during its manufacturing process.

The foam material articles are usually manufactured by means of moulds formed by two shells having inner cavities which, when both shells forming the mould are joined, define the final shape in which the article is to be formed. When the mould is open, a prefixed amount of reactive mixture is introduced in the cavity of the lower shell of the mould, then the upper shell of the mould is immediately superimposed. The reactive mixture starts quickly a foaming and cross-linking reaction, increases its volume up to fill in entirely the inner cavity of both shells of the mould, and then it sets by assuming a hardness depending upon the composition and quantity of the reactive mixture introduced in the mould. After a sufficient period of time, the mould may be opened and the produced article is removed from the mould. All these operations are effected in sequence and at the prescribed time by an automatic equipment. The components of the reactive mixture, once they are mixed together, react very quickly, and therefore the mixture has to be formed at the very moment it is introduced in the mould, by suitably metering its components which arrive through separate ducts to a metering head. In order to obtain an article having the desired features, it is required that the ratio of the components arrived to the metering head and the amount of the released mixture correspond, within certain tolerance limits, to prefixed values. By means of an automatic control equipment these operational parameters may be surveyed, processed and compared with the imposed limit values, and the control equipment may issue a warning signal each time for any reason a discrepancy between the detected values and the admitted fields of the imposed parameters is noticed. Whenever a warning signal is issued, an operator must mark the mould in whose respect the irregular operative parameters have been detected. When at a later time the produced article is extracted from the marked mould, it should be rejected or conveyed, separately from the correctly produced articles, to a particular examination in order to ascertain whether its characteristics may be accepted or it should be rejected. Nevertheless, the need for operators to mark a mould whenever an operative irregularity has been noticed and to shift away the article to a different destination as soon as it is extracted from a marked mould hinders the automatic production, imposes the requirement of personnel, otherwise not necessary, and moreover it introduces the possibility of human errors.

In order to preserve the automatic production it would be desirable to be able to mark not the mould, wherein an irregularly produced article is setting, but the article itself, whereby it could be separated from the regularly produced articles during any further step of the article treatment. This, however, has not been possible so far, because during the short period of time between the detection of the irregularity in the operative parameters and the immediately subsequent moment in which the mould is closed, the article has not yet been formed, and therefore it cannot receive any kind of marking.

BRIEF SUMMARY OF THE INVENTION

The object of the present invention is to provide a process and an equipment which, notwithstanding the difficulty just mentioned above, should enable marking the formed article whenever an irregularity in the operational parameters is detected, whereby this article may be identified during any further processing step, in order to check or reject it.

According to the process of the invention, as a consequence of the detection of an irregularity in at least one operational parameter after the introduction of the reactive mixture in the inner cavity of the lower shell of the mould, and as long as the same is open, to a part of the inner cavity of the upper shell of the mould is applied a mark formed by a dyestuff resistant to the processing conditions, chemically and physically compatible with the formed article and capable of adhering to the same when, during its expansion, it arrives to touch the marked part of the inner cavity of the upper shell of the mould.

By operating in this way, the mark applied to the inner cavity of the upper shell of the mould is transferred onto the article under process and it adheres then to the article when it is removed from the mould, whereby the irregularly produced article, which presumably may show some defects, remains permanently traceable during every further step of its processing, and it may be checked or rejected in any convenient moment.

Preferably, in the process according to the invention use is made of a dyestuff which transfers entirely from the inner cavity of the upper shell of the mould onto the formed article. In this way, no need exists for cleaning the mould in whose cavity the dyestuff has been applied. Such a dyestuff may advantageously consist of a water resistant quick drying ink, usually available on the market, which if needed may be diluted with a solvent.

Of course, the mark which features the process according to the invention may be applied by a workman whenever the surveying equipment detects an irregularity in the operational parameters, also in this case obtaining an advantage with respect to the usual process, both because the workman has only to apply the tracing mark and not to shift away the irregularly produced articles at the very moment they are removed from the mould, and because the different treatment of the irregularly produced articles can be carried out at every stage of the process, and not necessarily at the very moment they are removed from the mould. However the process according to the invention also shows the main feature that it may be completely automatized, by using a proper equipment which also is a subject of the invention.

The equipment according to the invention is intended to be annexed to an operating station arranged to introduce in the mould the reactive mixture and to close the upper shell of the mould and provided with an equipment for checking the operational parameters, and it is characterized in that it comprises a means for applying a mark of a dyestuff to a part of the inner cavity of the upper shell of the mould, and an operative connection between said means for applying a dyestuff mark and the checking equipment, arranged to operate the means for applying a dyestuff mark, after the introduction of the reactive mixture in the inner cavity of the lower shell of the mould and before the closure of the upper shell of the mould, whenever the checking equipment issues a signal indicating an irregularity in the operational parameters checked.

Thanks to this equipment, marking the article produced with irregular parameters is carried out automatically whenever an irregularity in the operational parameters is detected. Thus every engagement of workmen and any possibility of human error are avoided.

Preferably, said device for applying the dyestuff mark to a part of the inner cavity of the upper shell of the mould is an ejector arranged to project towards the inner cavity of the upper shell of the mould, while still open, the dyestuff intended to form the marking.

BRIEF DESCRIPTION OF THE DRAWING

These and other features and advantages of the subject of the invention will appear more clearly from the following description of an embodiment, which has the character of an example and no aim of limitation, of an equipment according to the invention, diagrammatically shown in the appended drawing, whose sole figure represents an elevational view of a mould in two halves, open, arranged in a station for the introduction of the reactive mixture in a mould, provided with an equipment for checking the operational parameters and with an equipment for applying a dyestuff mark according to the principle of the invention.

DETAILED DESCRIPTION OF THE PREFERRED EMBODIMENT

On the drawing, reference 1 indicates a fixed part of a mould holder, to which is hinged at 3 a mobile part 2 of the mould holder, operated by a motor means 4 arranged for lifting and lowering the mobile part 3 of the mould holder, by displacing it according to the bent arrow F1. On the parts 1 and 2 of the mould holder, two shells of the mould are applied, namely a lower shell 5 and an upper shell 7, respectively (which are shown in cross section), which have inner cavities 6 and 8, respectively. When the upper shell 7 is superimposed onto the lower shell 5, the inner cavities 6 and 8 define in their whole the shape of the article to be manufactured. In a production plant, a number of such moulds 1-2 are placed on a line and they are moved through an introduction station and then through other processing stations.

The station for the introduction of the reactive mixture includes a mixing and delivering head 9, usually displaceable along a slide 10, according to the arrow F2, between an operative position and a withdrawn position. In the operative position (shown in the drawing) the head 9 is placed over the inner cavity 6 of the lower shell 5 of the mould and can pour therein a flow M1 of a reactive mixture, which is collected at M2 in the cavity of shell 5. In the withdrawn position (not shown), head 9 enables lowering the mobile part 2 of the mould holder with the upper shell 7.

The mixing and delivering head 9 receives the components intended to make up the reactive mixture from at least two ducts 11 and 13 coming from delivering devices 12 and 14, respectively. On the ducts 11 and 13 metering devices 15 and 16 are inserted, in order to measure and communicate to a checking equipment 17 the quantities of components which, during every operation of production, are forwarded to the mixing and delivering head 9. In the checking equipment 17, this information is processed and compared with the correct parameters set and with the allowed tolerances, so as to verify whether the quantity and composition of the reactive mixture M2 introduced in the mould is such as to give rise to an article complying with the requirements. If not, the checking equipment 17 issues an output signal to a warning means 18.

According to the invention, in a position facing the upper shell 7 of the open mould an ejector 19 is arranged to project a jet C of a dyestuff towards a part of the inner cavity 8 of the upper shell 7 of the mould. This ejector receives the dyestuff from a tank 20 and is controlled by an operating device 21 which is connected to the output for the warning signal of the checking equipment 17, in such a way that a dyestuff jet is ejected when and only when the checking equipment 17 issues a warning signal, after having noticed that some of the operational parameters of the mixing and delivering head 9 did not correspond to the set values within the tolerance limits allowed. The warning device 18, in this case, may be kept or even it may be omitted.

The operation of the equipment is as follows.

When a mould holder 1-2 is brought up to the introduction station, it is open as it appears in the figure. The delivering head 9 is in the operative location shown and it starts delivering the reactive mixture M1 which is collected at M2 in the cavity 6 of the lower shell 5 of the mould. At the end of the delivery the delivering head 9 withdraws in order to allow closure of the mould. In the meantime, the checking equipment 17 is processing the parameters of the last operation of head 9 (quantity of the various components received and delivered) and is comparing them with the set values and the corresponding tolerance limits.

If the parameters appear to be acceptable, the checking equipment 17 does not intervene, and everything is carried on without application of the invention. After a certain short interval, usually from two to four seconds, motor 4 lowers the mobile part 2 of the mould holder, thus superimposing shell 7 to shell 5 and closing the mould, and the mould holder 1-2 is carried to the next station, while within the cavity of the mould the foaming and cross-linking reaction starts taking place. After a pre-established period of time, long enough for the setting of the formed article, mould 5-7 is automatically reopened, and the formed article is extracted and carried on to further processing.

If, on the contrary, the parameters of the operation carried out do not appear correct, then intervenes the application of the invention. In this case the checking equipment 17 issues a signal and this latter is received by the operating device 21, which activates nozzle 19 thus producing a short jet of dyestuff, which is projected onto a part of the inner cavity 8 of the upper shell 7 of the mould, where it deposits. This operation takes place in the short period of time between the withdrawal of the delivering head 9 and the closure of the mould 5-7. Therefore, when it leaves the introduction station, the closed mould has on an upper part of its inner cavity a mark of dyestuff. When the article which is processed inside the mould has expanded by action of the reactive mixture until it has reached the upper part of the mould cavity, it comes in contact with the mark of dyestuff, which adheres to it. Therefore, when the article is extracted from the mould, it shows a mark of dyestuff which markes it as an article in whose production some irregularity in the operational parameters has been noticed. At any further time this article may be traced in order to be rejected or subjected to special inspections directed to ascertain whether it can be accepted or not. If, as it is preferable, the dyestuff used is such as to transfer entirely from the mould wall onto the article, no trace of it will remain on the mould, which therefore may proceed at once with its operational cycle, without need for any cleaning.

The ejector 19 may be embodied, for example, by a spray gun whose nozzle 22 is closed by a needle 23 which is momentarily withdrawn when the operating device 21 controls the issue of a jet C of dyestuff, which reaches the cavity 8 of the shell 7 of the mould by passing over the reactive mixture M2 without contaminating it. For example, one could use an air-pen with a nozzle from 0.5 to 2 millimeters, operated by a pressure from 3 to 10 bar.

As dyestuff, a water resistant quick drying ink can be used, which is usually available on the market; for example the ink item 8401 traded by Gnocchi S.p.A. of Milan. If needed, the ink may be diluted by a solvent up to a viscosity ranging from 50 to 500 cps.

It should be understood, however, that other kinds of dyestuffs can also be used, such as paints, enamels, powdered adhesive pigments and so on, upon condition that they withstand the processing conditions, are compatible both chemically and physically with the produced article, adhere effectively onto it, adhere temporarily to the surface of the mould cavity and, preferably, they transfer entirely from the wall of the mould onto the article when this, by foaming, reaches them. Also the means for ejecting the dyestuff can be of various kinds, and they can either, and preferably, operate by means of a jet, as in the shown example, or in every other way spreading or locating the dyestuff in the cavity of the upper shell of the mould.

I claim:

1. In a process for the production of a molded article of foam material which process includes the steps of mixing reactive components in a metering head to prepare a reactive mixture, delivering said reaction mixture from said metering head to a cavity of a lower shell of an open mold, closing said mold by lowering an upper shell thereon, and forming said molded article within said closed mold, the improvement comprising monitoring operational parameters of said process to determine the existence of irregularities in said parameters which may result in the production of a defective molded article, and upon determining the existence of an irregularity in said parameters, subsequent to introduction of said reactive material into said lower shell portion of said mold and while said mold is still open, applying a mark to an inside surface of said upper shell portion, which mark is transferable to said molded article upon being formed in said mold to identify said article as being produced as a result of irregular operational parameters, and transferring said mark onto said molded article upon being formed in said mold.

2. The process of claim 1, wherein said mark applied to the inside surface of said upper shell is comprised of a dyestuff which is resistant to molding conditions employed.

3. The process of claim 2, wherein said mark is transferred completely from said upper shell to the molded article.

4. The process of claim 2, wherein said dyestuff comprises a water-resistant quick-drying ink.

5. The process of claim 4, wherein said ink is diluted with a solvent and exhibits a viscosity in the range of from 50 to 500 cps.

6. The process of claim 1, wherein said mark is applied to said upper shell of said mold automatically upon the existence of said irregularity being determined.

7. In molding apparatus for the production of a molded foam article, said apparatus comprising supply means for supplying reactive components, a metering head connected to said supply means for receiving reactive components therefrom and forming a reactive mixture thereof, a mold comprising a lower shell and an upper shell, means for lowering said upper shell onto said lower shell to close said mold, each of said lower and upper shells including inner mold cavities, said inner cavity of said lower mold being adapted to receive said reactive mixture from said metering head, the improvement wherein said apparatus further comprises surveying means to monitor operational parameters of said molding process to determine the existence of any irregularity which occurs with regard to said parameters, means to generate a signal in response to the existence of any such irregularity, and means to apply a material to a portion of a surface defining the inner cavity of said upper shell of said mold to form a mark in response to said generated signal prior to said mold being closed, said mark being formed of a material which is transferable to said molded article during said molding process.

8. The apparatus of claim 7, wherein said surveying means includes means for monitoring delivered quantities of reactive components which are delivered to said metering head.

9. The apparatus of claim 7, wherein said means to form a mark on a portion of said inner cavity defining surface of said upper shell comprises a spray ejector arranged to spray a material onto said surface.

10. The apparatus of claim 9, wherein said spray ejector comprises an air pen having a nozzle of from 0.5 to 2 millimeters in dimension and operated at a pressure of from 3 to 10 bar.

* * * * *